United States Patent [19]

Schleimann-Jensen

[11] Patent Number: 4,608,871
[45] Date of Patent: Sep. 2, 1986

[54] DEVICE FOR MEASURING THE LIQUID PORTION OF A TWO-PHASE FLOW OF GAS AND LIQUID

[76] Inventor: Arne H. Schleimann-Jensen, Jupitervägen 28A, S-191 47 Sollentuna, Sweden

[21] Appl. No.: 731,625
[22] PCT Filed: Aug. 15, 1984
[86] PCT No.: PCT/SE84/00276
§ 371 Date: Apr. 18, 1985
§ 102(e) Date: Apr. 18, 1985
[87] PCT Pub. No.: WO85/00881
PCT Pub. Date: Feb. 28, 1985

[51] Int. Cl.⁴ .......................... G01F 1/74; G01F 1/115
[52] U.S. Cl. .............................. 73/861.04; 73/861.83
[58] Field of Search ............ 73/861.04, 861.02, 861.03, 73/861.77, 861.78, 861.83

[56] References Cited

U.S. PATENT DOCUMENTS

| | | | |
|---|---|---|---|
| 3,075,383 | 1/1963 | Favill et al. | 73/861.04 |
| 3,140,606 | 7/1964 | Kramer et al. | 73/861.49 |
| 3,169,397 | 2/1965 | Murray | 73/861.03 |
| 3,218,855 | 11/1965 | Ichihara | 73/861.02 |
| 3,251,227 | 5/1966 | Ichihara et al. | 73/861.55 |
| 3,292,433 | 12/1966 | Ichihara | 73/861.55 |
| 3,370,465 | 2/1968 | Belle | 73/861.83 |
| 3,589,188 | 6/1971 | Belle | 73/861.83 |
| 3,636,767 | 1/1972 | Duffy | 73/861.77 |
| 3,709,037 | 1/1973 | Abbotts | 73/861.92 |
| 4,333,355 | 6/1982 | Dacus | 73/861.02 |
| 4,399,709 | 8/1983 | Diepold-Scharnitzky | 73/861.77 |

FOREIGN PATENT DOCUMENTS

| | | |
|---|---|---|
| 1498433 | 4/1969 | Fed. Rep. of Germany . |
| 1648097 | 4/1971 | Fed. Rep. of Germany . |
| 1773030 | 9/1971 | Fed. Rep. of Germany . |
| 1603943 | 6/1971 | France . |
| 226177 | 4/1969 | Sweden . |

Primary Examiner—Donald O. Woodiel
Attorney, Agent, or Firm—Pollock, Vande Sande & Priddy

[57] ABSTRACT

A device for measuring the liquid portion of a two-phase flow of gas and liquid in conveying a liquid by means of a gas comprises a tubular housing (1) and a turbine wheel (2) with axial throw-flow rotatably mounted therein, said turbine wheel being provided with at least one magnetic element (8) at a radially outward portion thereof, said element having limited extent axially and peripherally of said turbine wheel (2). The device furthermore comprises magnetic pick-up means (9) adapted to emit output signals responsive to the rotary speed of the turbine wheel (2), said wheel being mounted for axial movement in the direction of flow from an initial position against a biasing force. In order to provide for a reliable and much more precise metering of said liquid portion the inventive device is distinguished in that a plurality of pick-up means (9) are arranged axially spaced along the housing (1) for allowing a measuring of rotary speed of the turbine wheel (2) at various positions of movement within the housing (1) responsive to density as well as speed changes of the flow and hence a determination of the liquid portion thereof by means of a converting device (11), connected to all of the pick-up means (9).

3 Claims, 1 Drawing Figure

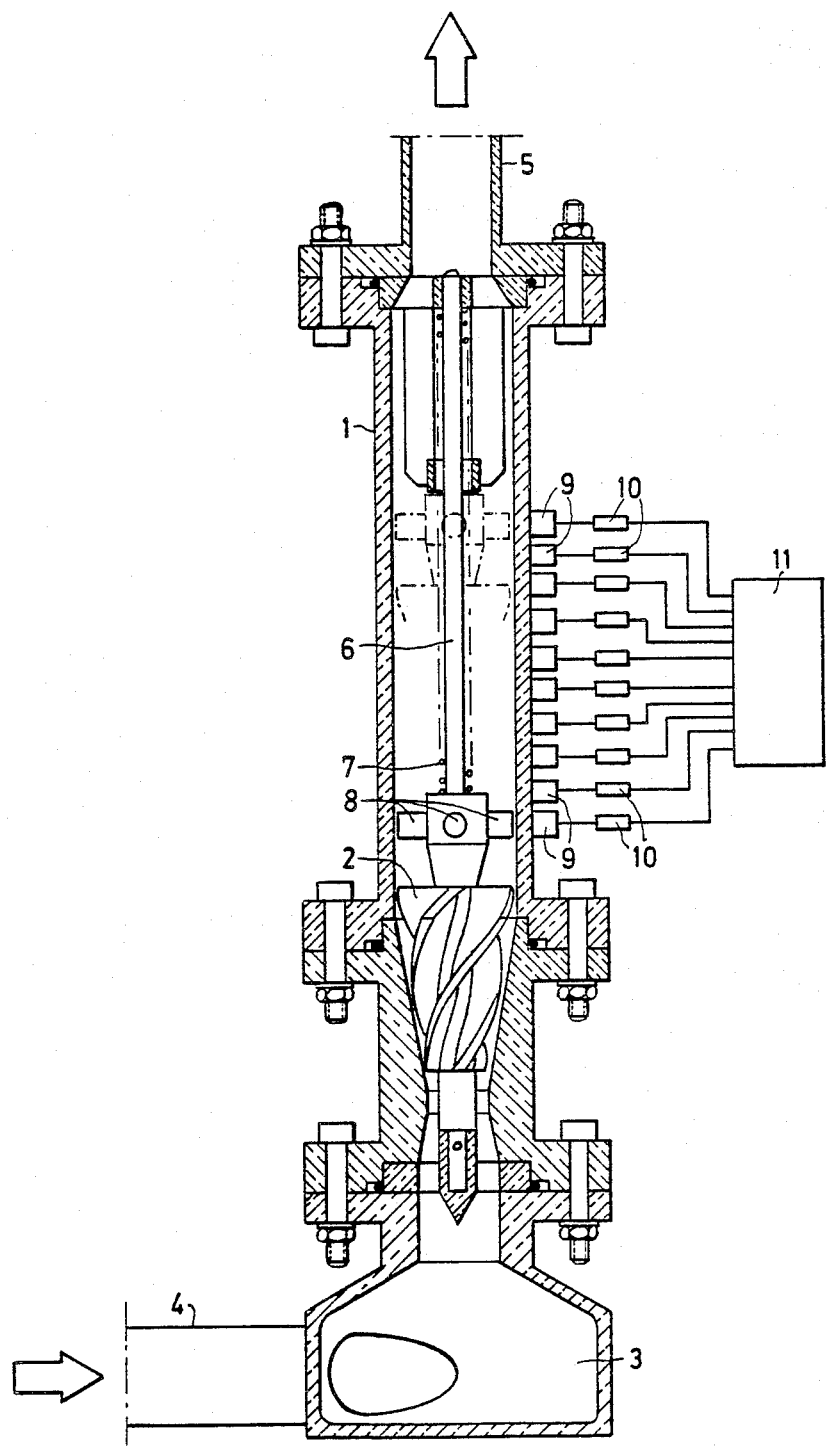

DEVICE FOR MEASURING THE LIQUID PORTION OF A TWO-PHASE FLOW OF GAS AND LIQUID

The present invention refers to a device for measuring the liquid portion of a two-phase flow of gas and liquid, particularly in conveying a liquid by means of a gas, in which two-phase flow the ratio of mixture between gas and liquid is widely varying, said device comprising a tubular housing and a turbine wheel with axial throw-flow rotatably mounted therein, said turbine wheel being provided with at least one magnetic element at a radially outward portion thereof, said element having limited extent axially and peripherally of said turbine wheel, said device furthermore comprising magnetic pick-up means adapted to emit output signals responsive to the rotary speed of the turbine wheel, said wheel being mounted for axial movement in the direction of flow from an initial portion against a biassing force.

Volume flow meters of the aforementioned kind are previously known, see e.g. SE C No. 226 177 (corr. to U.S. Pat. No. 3,370,465), FR A No. 1 603 943, U.S. Pat. Nos. 3,169,397, 3,589,188, 3,636,767. As examples of prior art concerned with the problem of measuring mass and mass-flow it might be referred to e.g. U.S. Pat. Nos. 3,251,227 and 3,292,433. All these prior art examples refer to solutions for eliminating problems met with in connexion with the ends of the measuring range, i.e. either the very small flows or flow velocities or great ones. It is common to all prior art thus mentioned that the flow to be measured is homogeneous, i.e. either gas or liquid.

In many different connexions it is of interest, however, to measure a liquid flow in which there also is present an admixed gas. As example of a field in which such a measuring is desirable it can be mentioned measuring of milk in connexion with milking machines For carrying out such measuring operations the meter according to the aforementioned Swedish patent specification cannot serve as well as no other previously known type of flow meter. In fact, it is since long a very definite understanding within this technical field that no measuring of two-phase flows, i.e. flows constituted by a mixture of liquid and gas, by no means can be carried out otherwise than with meters which can give a measuring error of the magnitude of up to 50%.

The demand for measuring two-phase mixtures recently has increased, however, particularly in connexion with milking machines and particularly due to the increased automatization within the agriculture and use of computer systems for the supervision of the cowsheds. Since air is used as conveying medium for the milk in such milking machines, it is then obtained a two-phase system of gas and liquid which thus has not been measurable with hitherto known equipments, not even with approximately acceptable accuracy.

The main purpose of the present invention therefore is to provide a device for measuring of a varying liquid flow in a two-phase flow of liquid with admixed gas, which device is simple and inexpensive and provides a reliable measuring result. According to the invention, this is achieved by means of a device which is substantially distinguished in that a plurality of pick-up means are arranged axially spaced along the housing for allowing a measuring of rotary speed of the turbine wheel at various positions of movement within the housing responsive to density as well as speed changes of the flow and hence a determination of the liquid portion thereof by means of a converting device connected to all of the pick-up means, the tubular housing preferably being mounted vertically with the turbine wheel in its initial position being located lowermost.

With this device it has been made possible for the first time to meter two-phase flows, i.e. flows containing both gas and liquid, with very good accuracy, the deviations amounting to only a few percent. The main reason for this seems to be the axial movability of the turbine wheel which provides for the turbine wheel to respond to frequent and sudden changes of the density or the mass of the flow, contrary to all prior art meters.

By way of example, the invention will be further described below with reference to the accompanying drawing, which illustrates a longitudinal section through a device according to an embodiment of the invention.

In the drawing is illustrated a metering device which consists substantially of a tubular housing 1 and a turbine wheel 2 with axial throw-flow and helically curved vanes, rotatably mounted within said housing 1. Preferably the housing 1 is mounted vertically and at its lowermost portion there is an inlet chamber 3 into which debouches an inlet conduit 4, preferably substantially in tangential direction. This namely implies that the flow of liquid with admixed gas is imparted a rotational movement before impinging the turbine wheel 2, said movement being directed opposite to the inclination of the vanes of the turbine wheel so as to increase the force of the flow on the turbine wheel. At the opposite end of the housing 1 is connected an outlet conduit 5.

In the embodiment illustrated, the turbine wheel 2 is rotatably and axially movably journalled on a shaft 6, which is coaxially located in the housing 1. The turbine wheel 2 may be biassed by a spring 7, which surrounds the shaft 6 and urges the turbine wheel 4 towards an initial position in the portion of the housing 1 being lowermost as illustrated. Furthermore, the turbine wheel 2 is provided with transducers 8 which are four in number in the illustrated embodiment and consist of magnetic elements which are arranged mutually circumferentially spaced 90° and which protrude to such an extent that their outer ends are located immediately adjacent the internal wall of the housing 1. As is evident from the drawing, the turbine wheel 2 thus is movable axially between the illustrated initial position and a limit position as indicated by means of broken lines in the drawing.

Externally of the housing 1 is located a plurality of pick-up means 9. Said pick-up means 9 are arranged in a row axially along the outer surface of the housing 1 and each pick-up means 9 is adapted to detect when one of the transducers 8 on the turbine wheel 2 passes inwardly of the respective pick-up means which thereby is caused to emit an output signal in the form of a pulse. In order to eliminate the need for using pick-up means of inductive type which still provide a certain braking action to the rotation of the turbine wheel and hence reduced metering accuracy it is suggested according to the invention that as pick-up means in connexion with the magnetic elements is used so-called Hallswitches, a kind of transistor-like means which let the current through not until a weak magnetic field is applied thereover. Since only the magnetic elements are made of metal while on the contrary the housing 1 is made of non-metallic material no braking action is provided on the turbine wheel 2. The pick-up means are connected through individual resistors 10 with a converting device 11 for converting the pulses from the pick-up means 9 to a measurement value. This conversion thereby is made depending both on the pulse frequency, which corresponds to the rotary speed of the turbine wheel 2 and on which pick-up means 9 emitting said pulses since this indicates the axial position of the turbine wheel 2 in the housing 1. Dependent on the very widely varying liquid mass being conveyed by means of the gas in every moment the turbine wheel 2 will namely not only rotate with varying revolutional number but also very fast and often vary its axial position. For each flow value the turbine wheel 2 will, however, exhibit a determined pulse pattern from the pick-up means 9 and this can be easily determined empirically for calibration of the device for the liquid in question. Mathematic and/or computer supported analysis of said pulse patterns then can be converted into definite values for the respective individual resistors 10 and thus a permanent calibration easily can be obtained for a determined field of use. By suitable arrangement of the converting device 11 it can thus be obtained therefrom one or several measurement values which indicate with great accuracy the liquid flow flowing through the housing 1, momentarily as well as integrated. It is also to be pointed out that the present device is particularly well suited for use in connexion with flows of the order of magnitude of 0.2–10 liters per minute, which is particularly suitable to use in connexion with milking machines even though the device of course also can be used for greater flows with suitable dimensional changes.

Of course, the invention is not limited to the embodiment described as example above but changes can be made within the scope of the accompanying claims.

I claim:

1. A device for measuring the liquid portion of a two-phase flow of gas and liquid, particularly in conveying a liquid by means of a gas, in which two-phase flow the ratio of mixture between gas and liquid is widely varying, said device comprising a tubular housing (1) and a turbine wheel (2) with axial throw-flow rotatably mounted therein, said turbine wheel being provided with at least one magnetic element (8) at a radially outward portion thereof, said element having limited extent axially and peripherally of said turbine wheel (2), said device furthermore comprising magnetic pick-up means (9) adapted to emit output signals responsive to the rotary speed of the turbine wheel (2), said wheel being mounted for axial movement in the direction of flow from an initial position against a biassing force, characterized in that a plurality of pick-up means (9) are arranged axially spaced along the housing (1) for allowing a measuring of rotary speed of the turbine wheel (2) at various positions of movement within the housing (1) responsive to density as well as speed changes of the flow and hence a determination of the liquid portion thereof by means of a converting device (11), connected to all of the pick-up means (9), the tubular housing (1) preferably being mounted vertically with the turbine wheel (2) in its initial position being located lowermost.

2. A device according to claim 1, characterized in that four magnetic elements (8) are mounted on the turbine wheel (2) with a mutual angular spacing of 90°.

3. A device according to claim 1 or 2, characterized in that the pick-up means (9) are so-called Hall switches.

* * * * *